July 16, 1935.  R. R. HARR  2,008,448
TANDEM SEAT
Filed Nov. 6, 1934  2 Sheets-Sheet 1
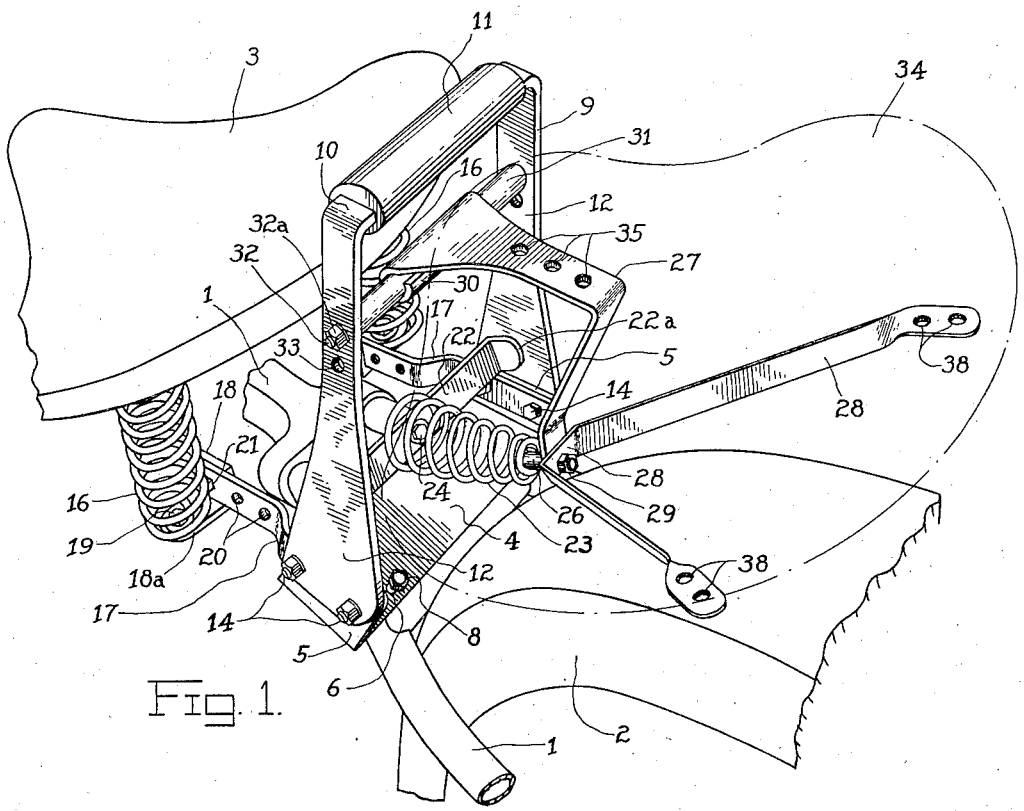
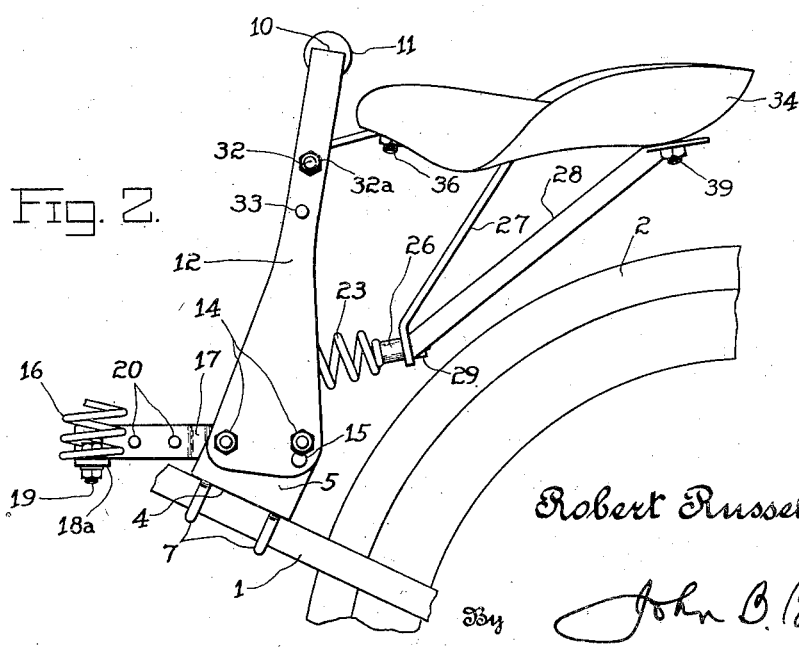
Inventor
Robert Russell Harr,
By John C. Brady
Attorney July 16, 1935.  R. R. HARR  2,008,448
TANDEM SEAT
Filed Nov. 6, 1934    2 Sheets-Sheet 2

Inventor
Robert Russell Harr,
By John C. Brady
Attorney

Patented July 16, 1935

2,008,448

UNITED STATES PATENT OFFICE 2,008,448

TANDEM SEAT

Robert Russell Harr, Takoma Park, Md.

Application November 6, 1934, Serial No. 751,759

8 Claims. (Cl. 208—24)

My invention relates broadly to seats and more particularly to the construction of a tandem seat adapted to be readily attached to motorcycles, bicycles, velocipedes, and other vehicles.

One of the objects of my invention is to provide a tandem seat which may be readily applied to a vehicle without consequential changes in the position of the driver's seat of the vehicle.

Another object of my invention is to provide a construction of tandem attachment for vehicles which is simple in its construction and inexpensive in manufacture and production and which may be attached to the vehicle frame in a position immediately behind the driver's seat.

Still another object of my invention is to provide a tandem attachment for vehicles in which a single spring member is employed for suspending the tandem seat in a position immediately behind the driver's seat.

A further object of my invention is to provide a construction of tandem seat for vehicles which is adjustable in position with respect to the driver's seat and which may be maintained in an adjusted position protected from substantial shock or vibration.

A still further object of my invention is to provide a construction of attachable frame for a tandem seat adapted to be connected with a vehicle frame and wherein the attachable frame includes means for resiliently supporting an adjustable tandem seat whereby the entire support for the tandem seat is effected through a connection of the attachable frame with the vehicle frame.

Another object of my invention is to provide the construction of attachable frame which is readily connectible to the frame of a vehicle and which provides in combination a hand grip and a flexible suspension for an adjustably mounted tandem seat.

Figure 3:
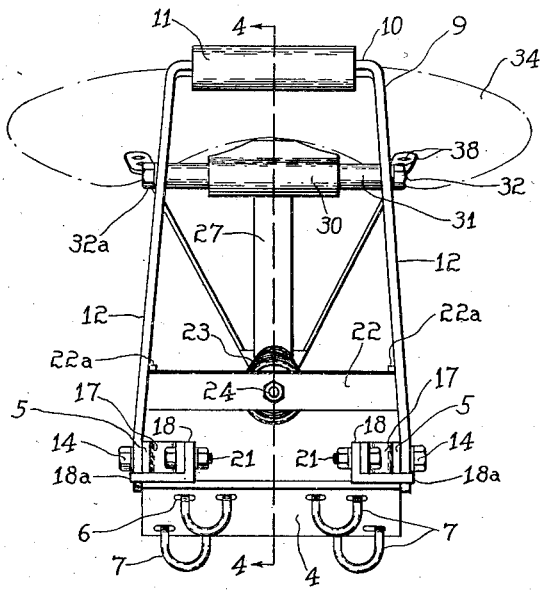
Figure 4:
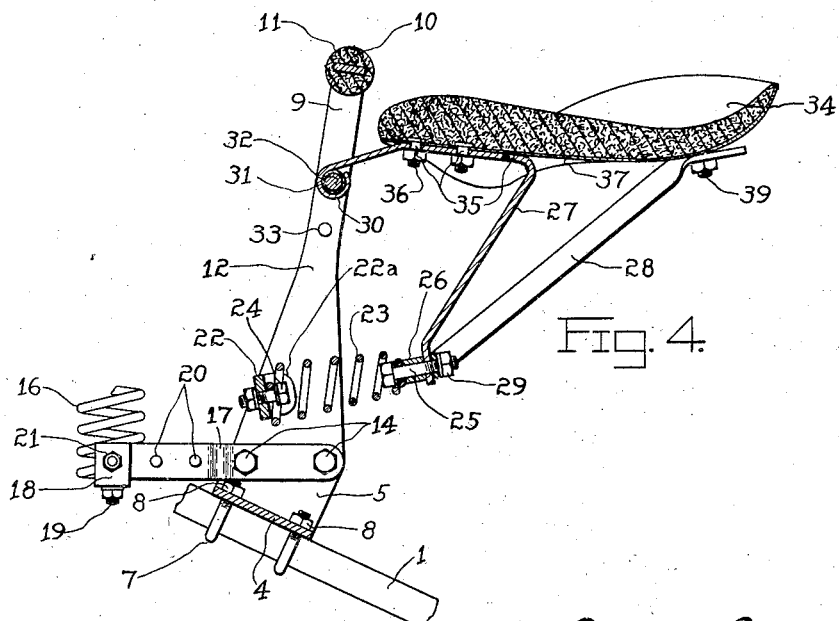

Other and further objects of my invention will be pointed out in the specification hereinafter following by reference to the accompanying drawings, in which:

Figure 1 is a perspective view showing the tandem seat of my invention applied to a motorcycle; Fig. 2 is a side elevational view of the tandem seat shown in Fig. 1; Fig. 3 is a view of the tandem seat attachment removed from the vehicle and looking from a position forward of the vehicle to the front of the attachment; and Fig. 4 is a cross-sectional view taken through the tandem attachment substantially on line 4—4 of Fig. 3.

My invention is directed to the construction of a simple appliance which is readily attachable to a vehicle and by which a tandem seat may be adjustably suspended and a hand grip provided for the occupant of the tandem seat without any other support between the tandem seat and the vehicle. The tandem seat of my invention is extremely simple in its construction and is capable of inexpensive manufacture and assembly on a quantity production scale. I provide an attachable frame structure which is connectible to the vehicle frame in a position immediately behind the driver's seat of the vehicle. The attachable frame carries means adjacent the upper portion thereof for pivotally supporting a tandem seat and means adjacent the lower portion thereof for cushioning the tandem seat. I provide a single spring element which is interposed between the attachable frame and a supporting member depending from the tandem seat. The attachable frame also provides a hand grip for the occupant of the tandem seat. Moreover, the attachable frame includes means projectible beneath the supporting springs of the driver's seat for firmly supporting the springs of the driver's seat. The single suspension for the tandem seat extends along the central axis of the vehicle and is so formed that shock and vibration is not transmitted to the tandem seat in any appreciable amount. The coil spring constituting the suspension for the tandem seat is so formed that the resistivity of the coil spring to compression increases as the tandem seat lowers under the weight of an occupant or as shock or vibration tends to subject the tandem seat to oscillatory movement under loaded conditions.

In the example of my invention illustrated herein, I have shown the tandem seat as applied to a motorcycle, but it will be understood that the tandem seat of my invention is applicable to any form of vehicle such as bicycles or velocipedes.

Referring to the drawings in detail, reference character 1 designates the frame of a motorcycle which is formed as a yoke extending on opposite sides of the rear wheel fender indicated generally at 2. The frame 1 extends at an angle immediately behind the driver's seat indicated in Figs. 1 and 3 and directly against frame 1 and intermediate the driver's seat 3, I provide a plate member 4 having opposite upstanding end lugs 5 thereon. The end lugs 5 extend in substantially vertical planes spaced one from the other on opposite sides of the central axis of the vehicle. The plate member 4 is provided with a multiplicity of longitudinally extending slots 6 through which U bolts 7 extend. The U bolts 7 are secured by means of nuts 8 bearing against the upper surface of plate 4. The elongated slots 6 afford means for readily centering plate 4 in position. The attachable frame of the tandem appliance of my invention is shown at 9 having a laterally extending portion 10 serving as means for supporting a hand grip shown at 11. The attachment is provided with depending side members 12 which increase in width adjacent the base thereof to a width corresponding to the width of the upwardly extending lugs 5. Bolt members 14 extend through the lower ends of side members 12 and through apertures provided in lugs 5 for supporting the attachable frame in position. In order to allow adjustment to be made in the angular position of frame 12, I provide two sets of apertures in side members 12 adjacent the edge nearest the rear of the vehicle. In Fig. 2, I have shown one of the apertures at 15 with bolt member 14 passing through the other of the apertures immediately above aperture 15. It will be understood that the contour of the frames of vehicles vary in many instances so that it is desirable to provide means for allowing the attachable frame to be adjusted to that angular position which best meets the conditions involved. While I have shown but one additional aperture 15 by which the attachable frame 12 may be secured to the vehicle frame in a selected position, it will be understood that I may provide additional apertures by which the frame 12 may be selectively fixed in position. The bolt members 14 which secure the lower extremities of frame 12 with respect to the upwardly projecting lugs 5 may be anchored with respect to lugs 5 by any suitable form of lock washer or other securing means.

I have found that in the installation of my tandem seat on some makes of motorcycles, a clamping member which normally supports the coil spring 16 of the driver's seat 3 must be removed to allow space for the attachable frame. I, therefore, provide means on the attachment of my invention for replacing the existing clamping device on the motorcycle frame and providing a support for the main coil springs 16 of the driver's seat 3. The structure which takes the place of the clamping means for normally supporting the coil springs 16 is represented by the extended brackets 17 which project forwardly from the attachable frame 12 and are secured thereto by means of bolt members 14. The brackets 17 are each bent inwardly and extend parallel with respect to each other beneath the driver's seat 3. Each of the brackets 17 carry angle members 18 which have laterally extending portions 18a projecting outwardly and serving as seats for the coil springs 16. The coil springs 16 are bolted in position on the lateral extensions 18a of angle members 18 by means of bolts represented at 19. It will be understood that the driver's seat 3 is shifted slightly forward to allow sufficient space for the attachable frame 12 to be mounted in position. Depending upon the conditions best suited to the driver, the seat 3 may be located in a variety of positions, and, for this purpose, I provide a multiplicity of apertures, represented at 20, through which bolt member 21 extends to support angle 18 in any selected position. As represented in the drawings, the angle 18 is shown mounted in an extreme position toward the end of the bracket 17. Adjustment of the angles 18 in desired positions along brackets 17 is an extremely simple operation as bolt members 21 merely need to be removed from one securing position and located in another securing position.

I provide a laterally extending member 22 disposed in a plane extending at an acute angle to the axis of frame 12 and having end portions in the form of lugs 22a spot-welded, riveted, or otherwise secured to the sides of the attachable frame 12 in positions immediately above the widened portions of the frame. The laterally extending member 22 serves as a seat for coil spring 23. A bolt member 24 passes through member 22 and is secured to the lower convolutions of coil spring 23. The coil spring 23 is substantially frusto-conical in contour and the compressive resistance thereof tends to increase as the coil spring is compressed. The coil spring 23 projects rearwardly along an axis substantially coincident with the central axis of the vehicle. The extreme outer end of coil spring 23 carries bolt member 25 having a head which clamps beneath the extreme end convolution of coil spring 23 against a sleeve member 26 which, in turn, bears against the confined end of the bracket member 27 and against the central portion of the bracket member 28. A nut 29 is secured upon the end of bolt 25 for clamping the bracket members 27 and 28 with respect to the end of the coil spring 23. The bracket member 27 is bent at an angle, as shown more clearly in Fig. 4 and has the end thereof rolled to shape as shown at 30 to grip the laterally extending sleeve 31. The rolled end 30 of bracket 27 is spot-welded, soldered, or otherwise rigidly secured to sleeve 31. The sleeve 31 provides an extended bearing adapted to angularly shift about the axis provided by bolt member 32 which extends through the sides of the attachable frame 12. The bolt member 32 is secured in position by a nut 32a but sufficient space is provided between the interior faces of the side members 12 and the ends of sleeve member 31 so as to allow sleeve member 31 to freely shift about bolt member 32 as an axis. In order to meet the conditions existent in various makes of motorcycles, I provide sets of apertures 33 in the sides of the attachable frame member 12 for the passage of bolt 32. In the illustration, bolt member 32 is located in the upper set of apertures 33 but there are conditions wherein bolt member 32 might be more effective when located in the lower set of apertures 33. The installation is, therefore, left with a high degree of flexibility to allow changes in positions of the tandem seat depending upon the particular conditions which must be met in different makes of motorcycles. The tandem seat has been shown at 34 and is, in itself, adjustable rearwardly or forwardly with respect to the brackets 27 and 28. Bracket 27 is apertured at 35 in a plurality of positions for receiving the bolt members 36 which are secured to the plate member 37 in tandem seat 34 to locate the tandem seat in the desired position with respect to driver's seat 3. Bracket 28 has multiple apertures in the extremities thereof, as shown at 38, to allow securing bolts 39 to be located in the desired position for mounting the tandem seat with respect to the driver's seat and with respect to the hand grip 11. It will, therefore, be seen that adjustments may be made with respect to the angular position of the attachable frame 12; the location of driver's seat 3 and the support of the spring 16 thereof in desired positions; the elevation of the tandem seat 34 with respect to the hand grip 11; and the selection of the longitudinal position of the tandem seat 34 along the axis of the vehicle. The entire support for the tandem seat 34 is provided through the medium of the attachment frame 12. Shock and vibration is absorbed by action of the single spring 23. Accurate balance is obtained by reason of the fact that all compressive forces are effected in the direction of the central axis of the vehicle.

By reason of the relatively small number of parts, the cost of manufacture and assembly of the tandem seat is relatively low and because of the simplicity in design, mass production is greatly facilitated. The construction of the tandem seat lends itself for installation on a variety of different makes of motorcycles.

I have shown my invention in one of its preferred forms, but I desire that it be understood that modifications may be made and that I intend no limitations upon my invention other than are imposed by the scope of the appended claims.

What I claim as new and desire to secure by Letters Patent of the United States is as follows:

1. A tandem seat or load carrying device, for vehicles, including a frame, a driver's seat and a rear fender, a member wholly supporting said tandem seat or load carrying device, said member being cantilevered from the vehicle frame in a position intermediate said driver's seat and said rear fender, and a tandem seat or load carrying device wholly supported by said frame.

2. A tandem seat or load carrying device, for vehicles, including a frame, a driver's seat and a rear fender, a member connectible with said frame intermediate said driver's seat and said rear fender, a readily detachable frame cantilevered from said member, and a tandem seat or load carrying device resiliently supported by said attachable frame.

3. A tandem seat or load carrying device, for vehicles, including a frame, a driver's seat, and a rear fender, a member connectible with said main frame intermediate said driver's seat and said rear fender, a readily detachable and attachable frame adjustably cantilevered to said member, a pivotally mounted carrier supported by said attachable frame, and a tandem seat adjustably mounted on said pivotally mounted carrier.

4. A tandem seat or load carrying device, for vehicles, including a frame, a driver's seat, and a rear fender, a member connectible with said main frame intermediate said driver's seat and said rear fender, an attachable frame adjustably connectible to said member, means supported by said member and projecting forwardly beneath the driver's seat, coil springs interposed between said driver's seat and said last mentioned means, a carrier pivotally mounted on said attachable frame, and a tandem seat supported by said carrier.

5. A tandem seat or load carrying device, for vehicles, having a main frame, a driver's seat and a rear fender, a member attachable to said main frame intermediate said driver's seat and said rear fender, an attachable frame connectible with said member, a carrier pivotally mounted on said attachable frame, a resilient shock absorbing device interposed between one end of said carrier and a portion of said attachable frame, and a tandem seat mounted on said carrier.

6. A tandem seat or load carrying device, for vehicles, having a main frame, a driver's seat and a rear fender, a member connectible with said main frame intermediate said driver's seat and said rear fender, an attachable frame connectible with said member, a hand grip adjacent the upper extremity of said adjustable frame, an adjustable pivot member carried by said attachable frame, a carrier rockably mounted on said attachable frame in a position below said hand grip, a resilient shock absorbing device interposed between one end of said carrier and a portion of said attachable frame, and a tandem seat adjustably mounted on said carrier.

7. A tandem seat or load carrying device, for vehicles, having a main frame, a driver's seat and a rear fender, a member connectible with said main frame in a position intermediate said driver's seat and said rear fender, an attachable frame adjustably connected with said member, a hand grip formed on the upper extremity of said attachable frame, a laterally extending member disposed adjacent the lower end of said attachable frame, a carrier pivotally mounted with respect to said attachable frame in a position below said hand grip and a single coil spring interposed between one end of said carrier and the laterally extending member on said attachable frame in alignment with the central axis of the vehicle, and a tandem seat adjustably mounted on said carrier.

8. A tandem seat, or load carrying device, for vehicles, having a main frame structure and including a driver's seat and a rear fender, a member connectible with said main frame structure intermediate said driver's seat and said rear fender, an attachable frame connectible with said member, longitudinally extending members connectible with said attachable frame and with the aforesaid member, carriers adjustably mounted on each of said longitudinally extending members, coil spring supports for said driver's seat mounted on said carriers and adapted to be moved to selected positions, a pivotally mounted carrier supported by said attachable frame, a shock absorbing device for suspending said pivotally mounted carrier with respect to said attachable frame and a tandem seat supported by said pivotally mounted carrier.

ROBERT RUSSELL HARR.